United States Patent
Cuevas Lopez et al.

(10) Patent No.: US 12,307,468 B2
(45) Date of Patent: May 20, 2025

(54) PRODUCT COMPLIANCE AND CERTIFICATION VALIDATION

(71) Applicant: International Business Machines Corporation, Armonk, NY (US)

(72) Inventors: Edgar Roberto Cuevas Lopez, Tlaquepaque (MX); Jazmin Rodriguez Aguilera, Zapopan (MX); Jonathan Oswaldo Lara Dominguez, Guadalajara (MX); Rafael Islas Torres, Zapopan (MX); Cesar Augusto Rodriguez Bravo, Alajuela (CR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/547,012

(22) Filed: Dec. 9, 2021

(65) Prior Publication Data
US 2023/0186323 A1    Jun. 15, 2023

(51) Int. Cl.
*G06Q 30/018*    (2023.01)
*G06V 30/14*    (2022.01)

(52) U.S. Cl.
CPC ..... *G06Q 30/0185* (2013.01); *G06V 30/1448* (2022.01)

(58) Field of Classification Search
CPC .............. G06Q 30/0185; G06V 30/1448
See application file for complete search history.

(56) References Cited

U.S. PATENT DOCUMENTS 5,770,841 A * 6/1998 Moed ............ B07C 3/00
                                              235/375
6,246,778 B1 * 6/2001 Moore ............ G06V 10/143
                                              340/5.1
(Continued)

FOREIGN PATENT DOCUMENTS

CN    107798542 A    3/2018
WO    2017018769 A2    2/2017
WO    2019190422 A2    10/2019

OTHER PUBLICATIONS

Agapakis, John, and Luis Figarella. "Improving yield, productivity, and quality in test assembly and packaging through direct part marking and unit level traceability." 27th Annual IEEE/SEMI International Electronics Manufacturing Technology Symposium. IEEE, 2002. (Year: 2002).*

(Continued)

*Primary Examiner* — Corey Russ
(74) *Attorney, Agent, or Firm* — Zilka-Kotab, P.C.

(57) ABSTRACT

In an approach for product compliance and certification validation, a processor, in response to receiving a product at a validation point, inspects the product using a plurality of sensors, including an image recognition system, to identify at least one certification label associated with the product. A processor correlates information received from the plurality of sensors, including image data, against information in a certification database to create correlation data. A processor validates the correlation data against destination information for the product. A processor, in response to receiving a negative validation, sends an indication of invalid to ship (Continued)

status to a predetermined destination. A processor reroutes the product as a rejected item to a predetermined position for inspection.

4 Claims, 4 Drawing Sheets

(56) References Cited

U.S. PATENT DOCUMENTS

| | | | | |
|---|---|---|---|---|
| 6,995,673 | B1* | 2/2006 | Osredkar | G06Q 10/08 340/572.1 |
| 7,161,688 | B1* | 1/2007 | Bonner | B07C 3/00 356/627 |
| 7,313,460 | B1* | 12/2007 | Prater | G06Q 10/087 700/226 |
| 7,751,929 | B1* | 7/2010 | Prater | G06Q 10/087 700/227 |
| 9,619,761 | B2 | 4/2017 | Dlott | |
| 10,210,321 | B2 | 2/2019 | Loughlin-McHugh | |
| 11,534,923 | B1* | 12/2022 | De Arruda Camargo Polido | B25J 9/1674 |
| 2001/0030232 | A1* | 10/2001 | Piatek | G06Q 10/08 705/317 |
| 2002/0198752 | A1* | 12/2002 | Stiffler | G06Q 10/0834 705/331 |
| 2004/0098356 | A1 | 5/2004 | Shabtai | |
| 2004/0125405 | A1* | 7/2004 | Salomon | G06Q 10/00 358/1.18 |
| 2004/0149823 | A1* | 8/2004 | Aptekar | G06Q 10/0875 235/385 |
| 2004/0175038 | A1* | 9/2004 | Bonner | G06V 30/274 382/181 |
| 2005/0222853 | A1* | 10/2005 | Black | G06Q 30/0283 705/331 |
| 2007/0051816 | A1 | 3/2007 | Chu | |
| 2007/0126578 | A1* | 6/2007 | Broussard | G06Q 10/087 705/28 |
| 2007/0203660 | A1 | 8/2007 | North | |
| 2010/0082151 | A1* | 4/2010 | Young | G06Q 10/083 700/226 |
| 2010/0332284 | A1* | 12/2010 | Hilbush | G06Q 10/06311 705/336 |
| 2012/0137138 | A1* | 5/2012 | Gregorovic | G06F 8/61 707/694 |
| 2014/0025594 | A1 | 1/2014 | Schmitz | |
| 2015/0010228 | A1* | 1/2015 | Rogers | G01B 11/2755 382/141 |
| 2015/0127563 | A1 | 5/2015 | Young | |
| 2017/0046656 | A1* | 2/2017 | Bramble | G06F 16/9535 |
| 2017/0136632 | A1* | 5/2017 | Wagner | B25J 9/0093 |
| 2017/0220908 | A1* | 8/2017 | Ogaki | G06Q 10/083 |
| 2017/0220976 | A1* | 8/2017 | Schmidt | G06Q 10/083 |
| 2017/0235977 | A1* | 8/2017 | Nadabar | G06V 10/141 235/375 |
| 2018/0197139 | A1* | 7/2018 | Hill | G06Q 10/0838 |
| 2019/0303862 | A1* | 10/2019 | Bollinger | G06Q 10/0838 |
| 2019/0362297 | A1* | 11/2019 | Farley | G06N 20/00 |
| 2021/0027452 | A1 | 1/2021 | Mok | |
| 2021/0365685 | A1* | 11/2021 | Shah | G06V 20/20 |
| 2022/0097892 | A1* | 3/2022 | Wen | B65C 9/44 |
| 2024/0119406 | A1* | 4/2024 | Bollinger | G06K 7/1413 |

OTHER PUBLICATIONS

Suh, Sungho, et al. "Robust shipping label recognition and validation for logistics by using deep neural networks." 2019 IEEE International Conference on Image Processing (ICIP). IEEE, 2019. (Year: 2019).*

* cited by examiner

PRODUCT COMPLIANCE AND CERTIFICATION VALIDATION

BACKGROUND

The present disclosure relates generally to the field of product inspection, and more particularly to product compliance and certification validation.

A certificate of compliance is a formal certification declaring that an individual or company has met a set of conditions. In trade, a certificate of compliance may be given to exporters or importers to show that the goods or services purchased meet the required standards of a given country. This document may be usually required to be presented during customs clearance. Many countries require a certificate of compliance to make sure that imported products meet all international standards before exportation. Consignments that meet acceptable international standards are given a certificate of compliance. Product certification can be explained as the process of certifying that a specific product fulfils requirements set out in contracts, regulations or specifications (aka "certification schemes") and has passed all necessary quality assurance and performance tests. Product certification may be required in industries and marketplaces where product failure could bring serious negative consequences to the health and safety of people, animals and property. Sometimes the consequences can be even fatal. Product certification may give product users the confidence they need to purchase certain goods. If a product is certified according to applicable national or international laws, customers know that that product will function correctly and won't cause any harm.

Violations of product certification very often result in severe legal punishments such as monetary fines and product recalls, or even imprisonment. Certified products may be typically endorsed with a certification mark, aka conformity mark (e.g., logo or sticker). The product certifier may provide the product certification mark. The product certification mark may be usually affixed to the product itself, somewhere easy to see. The product certification mark may allow users to track down the type of certification to determine the criteria that a specific product meets.

SUMMARY

Aspects of an embodiment of the present disclosure disclose an approach for product compliance and certification validation. A processor, in response to receiving a product at a validation point, inspects the product using a plurality of sensors, including an image recognition system, to identify at least one certification label associated with the product. A processor correlates information received from the plurality of sensors, including image data, against information in a certification database to create correlation data. A processor validates the correlation data against destination information for the product. A processor, in response to receiving a negative validation, sends an indication of invalid to ship status to a predetermined destination. A processor reroutes the product as a rejected item to a predetermined position for inspection

DETAILED DESCRIPTION

Figure 1:
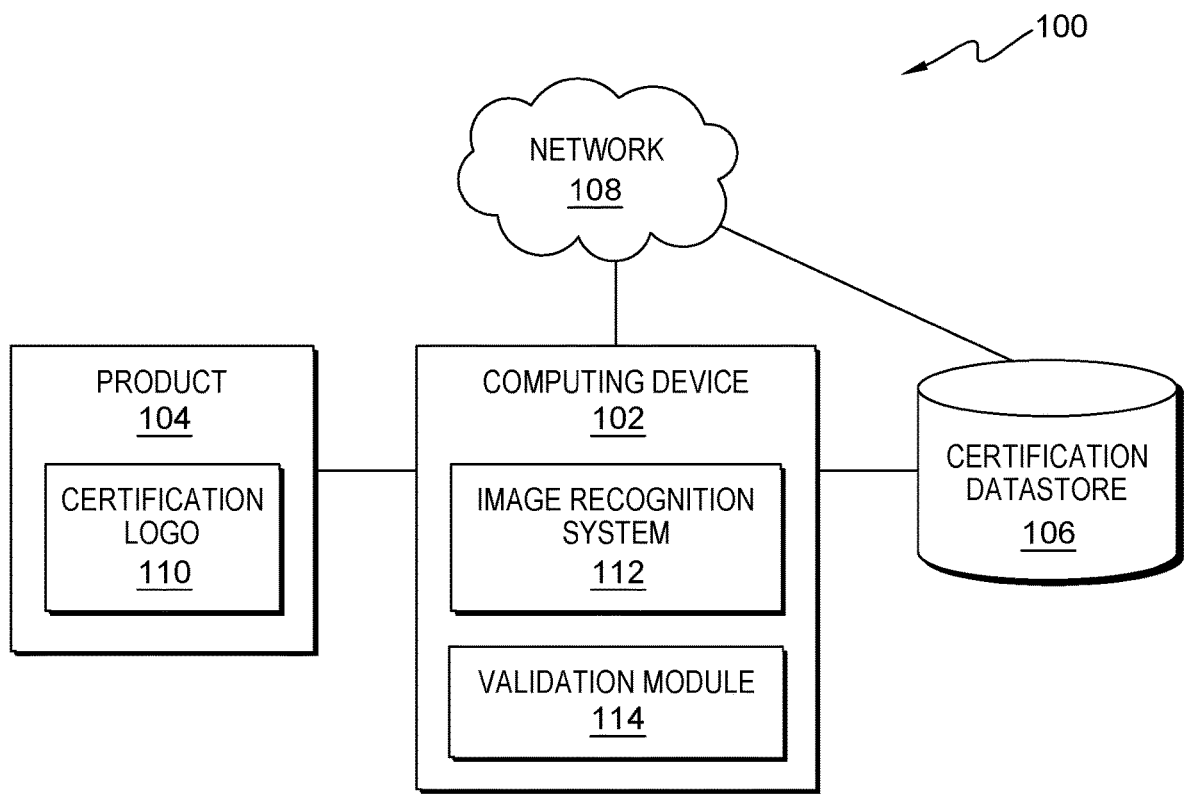
FIG. 1 is a functional block diagram illustrating a product certification validation environment, in accordance with an embodiment of the present disclosure.

The present disclosure is directed to systems and methods for product compliance and certification validation.

Embodiments of the present disclosure recognize a need for products (e.g., electronic products) to meet certification requirements in a country in order to be sold in that country. The required certifications may depend on the countries where the products will be sold. In an example, a new product introduction process must validate that products (including components) have corresponding certifications for the countries where the products will be sold. Embodiments of the present disclosure recognize a need for automatically validating the product certifications at a manufacturing line. Embodiments of the present disclosure disclose using an image recognition system and database data correlation to ensure that the product can be shipped to a specific country with the required regulations.

Embodiments of the present disclosure disclose an automated inspection using emerging technologies which may avoid human factor susceptible to errors. Embodiments of the present disclosure disclose a monitor engine that uses image recognition in the process to validate certifications of products. Embodiments of the present disclosure disclose correlating the images of the certification logos on the product against a database of certifications to determine which the certifications are required on the products. Embodiments of the present disclosure disclose gathering the shipping information of the products and gathering (e.g., from an internal or external database) the requirements to export to a specific country.

Embodiments of the present disclosure disclose systems and methods that visually identify the certifications of a given product and correlate the certifications against the export requirements of the country of destination based on the shipping information autonomously. Embodiments of the present disclosure disclose automatically interpreting the information of the required certifications by image recognition and data correlation. Embodiments of the present disclosure disclose systems and methods that visually identify components (e.g., electronic components) of a given product (e.g., a server or computing device) to capture the certification logos (e.g., stickers) with the information related to the certifications for a part (e.g., a power supply) of the product.

Embodiments of the present disclosure disclose a device with a camera at an inspection point may validate the certifications using image recognition techniques. Embodiments of the present disclosure disclose a system that does a correlation of the image taken against a certification database. Embodiments of the present disclosure disclose a system that automatically validates the country destiny of the order to ensure the product has the required certifications. In an example, once the information is validated, the system may alert visually color coding based on lights and may send alerts to a quality control department. Embodiments of the present disclosure disclose a system that can relate to industry 4.0 systems to automatically reroute rejected items to a different bin for revision (e.g., to avoid a stop on the production line). Embodiments of the present disclosure disclose identifying certifications of products by various methods, e.g., QR codes, 3D laser scanners. Embodiments of the present disclosure disclose sending an alert requesting a manual inspection of a product in case the system is unable to read a given a tag (e.g., due to bad printing, dust). Embodiments of the present disclosure disclose using multiple angles cameras, high-definition cameras, rotating cameras, and floor cameras to enhance scanning. Embodiments of the present disclosure disclose adjusting an image recognition device to focus on a particular location of a specific part (e.g., a power supply) of the product. Embodiments of the present disclosure disclose detecting (e.g., using a trained imagine recognition module) the position of a specific part (e.g., a power supply) to perform a capture of the stickers of the certifications. Embodiments of the present disclosure disclose supporting rotation to identify and scan the stickers of the certifications (e.g., to mount on a gyroscopic robotic arm).

The present disclosure will now be described in detail with reference to the Figures. FIG. 1 is a functional block diagram illustrating a product certification validation environment, generally designated 100, in accordance with an embodiment of the present disclosure.

In the depicted embodiment, product certification validation 100 includes computing device 102, product 104, certification database 106, and network 108. Product 104 can be any product to be inspected for having corresponding certifications for the countries where product 104 will be sold. In an example, product 104 can be electronic products that require certifications in order to be sold. These certifications needed may depend on the countries where product will be marketed and sold. Product 104 may be sold if product 104 meets the agency requirements for that country to be shipped to. If product 104 does not meet the agency requirements, product 104 cannot be sold in that specific country. An agency label (e.g., certification logo 110) for product 104 must have the corresponding logo certification in order to avoid legal penalties due to lack of compliance. In the depicted embodiment, product 104 represents a single product to be inspected and validated. However, in many other embodiments, product 104 represents many multiple products to be inspected and validated. Product 104 may include components. Product 104 may include certification logo 110 that shows product 104 has been approved for shipping to a certain country. In the depicted embodiment, product 104 includes a single certification logo. However, in other embodiments, product may include many multiple certification logos. Each certification logo may represent a corresponding certification from a corresponding agency requirement for shipping product 104 to a certain country. In an example, at a product introduction process, all assemblies and subassemblies for product 104 may validate that all components in product 104 have the corresponding certifications for the countries where product 104 will be sold. The corresponding certification information can be located in certification database 106. In an example, certification database 106 may include certification information indicating the required regulations (e.g., exporting requirements) that product 104 needs to comply. In the depicted embodiment, certification database 106 is located externally and can be accessed through network 108 or accessed directly from computing device 102. However, in other embodiments, certification database 106 can be located in computing device 102.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to validation module 114 and network 108 and is capable of processing program instructions and executing validation module 114, in accordance with an embodiment of the present disclosure. Computing device 102 may include internal and external hardware components, as depicted and described in further detail with respect to FIG. 4.

Further, in the depicted embodiment, computing device 102 includes image recognition system 112 and validation module 114. In the depicted embodiment, image recognition system 112 and validation module 114 are located on computing device 102. However, in other embodiments, image recognition system 112 and validation module 114 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and image recognition system 112 and validation module 114, in accordance with a desired embodiment of the disclosure.

In one or more embodiments, image recognition system 112 is configured to include a plurality of sensors to identify at least one certification logo 110 associated with product 104. In an example, certification logo 110 can be printed in a certification sticker. Image recognition system 112 may Visually identify the certifications of product 104. Image recognition system 112 may identify shipping country information from product 104. In an example, image recognition system 112 may identify certification logo 110 using quick response (QR) code, a 3D laser scanner, or other suitable techniques. In an example, the plurality of sensors can be multiple angles cameras, high-definition cameras, rotating cameras, floor cameras (e.g., with a transparent section of a band), or any other suitable sensors to identify certification logo 110. Image recognition system 112 may visually identify components of product 104 to better capture certification logo 110 with the information related to the certifications for a part (e.g., a power supply). For example, as most regulations are related to electric factors, certification logo 110 may be usually located on the power supply of product 104. Image recognition system 112 may adjust the plurality of sensors (e.g., cameras) to focus on the location of the power supply of product 104. Image recognition system 112 may detect the position of the part (e.g., a power supply) to perform a better capture of the stickers of the certifications. In an example, one or more sensors to detect the part can be mounted on a gyroscopic robotic arm to support rotation to identify and scan certification logo 110.

In one or more embodiments, validation module 114 is configured to, in response to receiving product 104, at a validation point, inspect product 104 using a plurality of sensors (e.g., image recognition system 112) to identify at least one certification logo 110 associated with product 104. In an example, certification logo 110 can be printed in a certification sticker. Validation module 114 may visually identify the certifications of product 104 and may correlate the certifications against the export requirements of a country of destination based on the shipping information autonomously. Validation module 114 may identify shipping country information from product 104. In an example, validation module 114 may identify certification logo 110 using QR code, a 3D laser scanner, or other suitable techniques. Validation module 114 may send an alert requesting a manual inspection of product 104 if validation module 114 determined certification logo 110 is unreadable. In an example, the plurality of sensors can be multiple angles cameras, high-definition cameras, rotating cameras, floor cameras (e.g., with a transparent section of a band), or any other suitable sensors to identify certification logo 110. Validation module 114 may visually identify components of product 104 to better capture certification logo 110 with the information related to the certifications for a part (e.g., a power supply). For example, as most regulations are related to electric factors, certification logo 110 may be usually located on the power supply of product 104. Validation module 114 may adjust the plurality of sensors (e.g., cameras) to focus on the location of the power supply of product 104. Validation module 114 may detect the position of the part (e.g., a power supply) to perform a better capture of the stickers of the certifications. In an example, one or more sensors to detect the part can be mounted on a gyroscopic robotic arm to support rotation to identify and scan certification logo 110.

In one or more embodiments, validation module 114 is configured to correlate information received from the plurality of sensors, including image data, against information in certification database to create correlation data. Validation module 114 may create correlation data based on shipping country information on product 104 and certification required for the shipping country for product 104. Validation module 114 may perform a correlation of the image taken through image recognition system 112 against certification database 106. Validation module 114 may correlate the image of certification logo 110 on product 104 against certification database 106 to determine which certifications on product 104.

In one or more embodiments, validation module 114 is configured to validate the correlation data against country of destination information for product 104. Validation module may automatically validate the country destiny of the order to ensure product 104 has the required certifications. Validation module may identify the certifications of product 104 and may correlate the certifications against the export requirements of the country of destination based on the shipping information. Validation module may identify components of product 104 to capture certification logo 110 with the information related to the certifications for said part (e.g., a power supply). Validation module may validate the certifications using image recognition techniques. Validation module may focus on automated inspection using emerging technologies, e.g., from industry 4.0 techniques, which would avoid human factor susceptible to errors.

In one or more embodiments, validation module 114 is configured to, in response to receiving a negative validation, send an indication of invalid to ship status to the predetermined destination. Validation module 114 may reroute product 104 as a rejected item to a predetermined position for at least one of revision and manual inspection if validation module 114 determines that product 104 does not have a required certification logo. In response to receiving a positive validation, validation module 114 may send an indication of valid to ship status to a predetermined destination. Validation module 114 may gather the shipping information of product 104 and may gather from an internal or external database (e.g., certification database 106) the requirements to export to the designated country. Validation module 114 may alert visually color coding based on lights and may send alerts to a quality department. Validation module 114 may automatically reroute rejected items to a different bin for revision (e.g., to avoid a stop on the production line).

Figure 2:
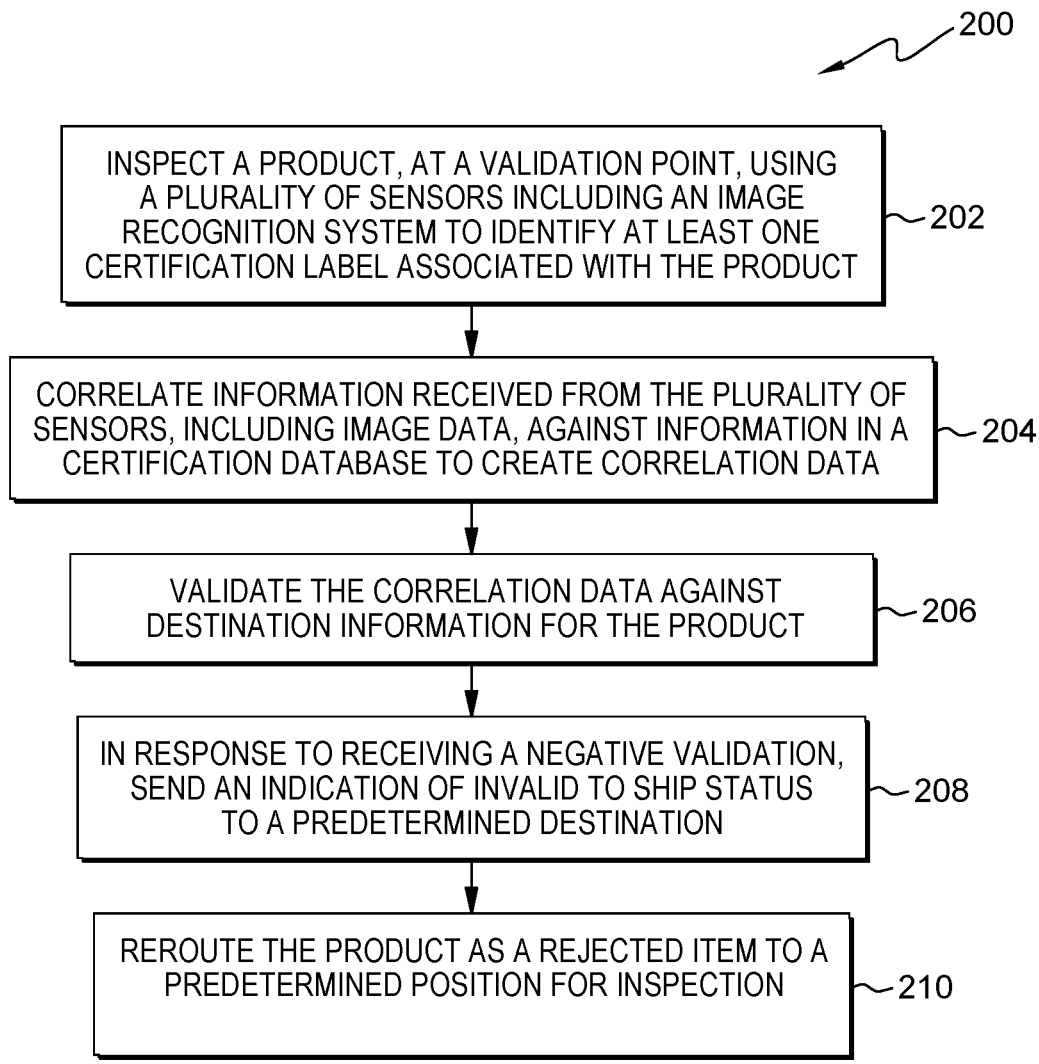
FIG. 2 is a flowchart depicting operational steps of a validation module within a computing device of FIG. 1, in accordance with an embodiment of the present disclosure.

FIG. 2 is a flowchart 200 depicting operational steps of validation module 114 in accordance with an embodiment of the present disclosure.

Validation module 114 operates to inspect product 104 using a plurality of sensors (e.g., image recognition system 112) to identify at least one certification logo 110 associated with product 104. Validation module 114 may receive product 104 at a validation point. Validation module 114 also operates to correlate information received from the plurality of sensors, including image data, against information in certification database to create correlation data. Validation module 114 operates to validate the correlation data against country of destination information for product 104. Validation module may automatically validate the country destiny of the order to ensure product 104 has the required certifications. Validation module 114 operates to send an indication of invalid to ship status to the predetermined destination if validation module 114 receives a negative validation. Validation module 114 operates to reroute product 104 as a rejected item to a predetermined position for at least one of revision and manual inspection if validation module 114 determines that product 104 does not have a required certification logo. If validation module 114 receives a positive validation, validation module 114 may send an indication of valid to ship status to a predetermined destination.

In step 202, validation module 114 inspects product 104 using a plurality of sensors (e.g., image recognition system 112) to identify at least one certification logo 110 associated with product 104. Validation module 114 may receive product 104 at a validation point. In an example, certification logo 110 can be printed in a certification sticker. Validation module 114 may Visually identify the certifications of product 104 and may correlate the certifications against the export requirements of a country of destination based on the shipping information autonomously. Validation module 114 may identify shipping country information from product 104. In an example, validation module 114 may identify certification logo 110 using QR code, a 3D laser scanner, or other suitable techniques. Validation module 114 may send an alert requesting a manual inspection of product 104 if validation module 114 determined certification logo 110 is unreadable. In an example, the plurality of sensors can be multiple angles cameras, high-definition cameras, rotating cameras, floor cameras (e.g., with a transparent section of a band), or any other suitable sensors to identify certification logo 110. Validation module 114 may visually identify components of product 104 to better capture certification logo 110 with the information related to the certifications for a part (e.g., a power supply). For example, as most regulations are related to electric factors, certification logo 110 may be usually located on the power supply of product 104. Validation module 114 may adjust the plurality of sensors (e.g., cameras) to focus on the location of the power supply of product 104. Validation module 114 may detect the position of the part (e.g., a power supply) to perform a better capture of the stickers of the certifications. In an example, one or more sensors to detect the part can be mounted on a gyroscopic robotic arm to support rotation to identify and scan certification logo 110.

In step 204, validation module 114 correlates information received from the plurality of sensors, including image data, against information in certification database to create correlation data. Validation module 114 may create correlation data based on shipping country information on product 104 and certification required for the shipping country for product 104. Validation module 114 may perform a correlation of the image taken through image recognition system 112 against certification database 106. Validation module 114 may correlate the image of certification logo 110 on product 104 against certification database 106 to determine which certifications on product 104.

In step 206, validation module 114 validates the correlation data against country of destination information for product 104. Validation module may automatically validate the country destiny of the order to ensure product 104 has the required certifications. Validation module may identify the certifications of product 104 and may correlate the certifications against the export requirements of the country of destination based on the shipping information. Validation module may identify components of product 104 to capture certification logo 110 with the information related to the certifications for said part (e.g., a power supply). Validation module may validate the certifications using image recognition techniques. Validation module may focus on automated inspection using emerging technologies, e.g., from industry 4.0 techniques, which would avoid human factor susceptible to errors.

In step 208, validation module 114 sends an indication of invalid to ship status to the predetermined destination if validation module 114 receives a negative validation. In step 210, validation module 114 reroutes product 104 as a rejected item to a predetermined position for at least one of revision and manual inspection if validation module 114 determines that product 104 does not have a required certification logo. If validation module 114 receives a positive validation, validation module 114 may send an indication of valid to ship status to a predetermined destination. Validation module 114 may gather the shipping information of product 104 and may gather from an internal or external database (e.g., certification database 106) the requirements to export to the designated country. Validation module 114 may alert visually color coding based on lights and may send alerts to a quality department. Validation module 114 may automatically reroute rejected items to a different bin for revision (e.g., to avoid a stop on the production line).

Figure 3:
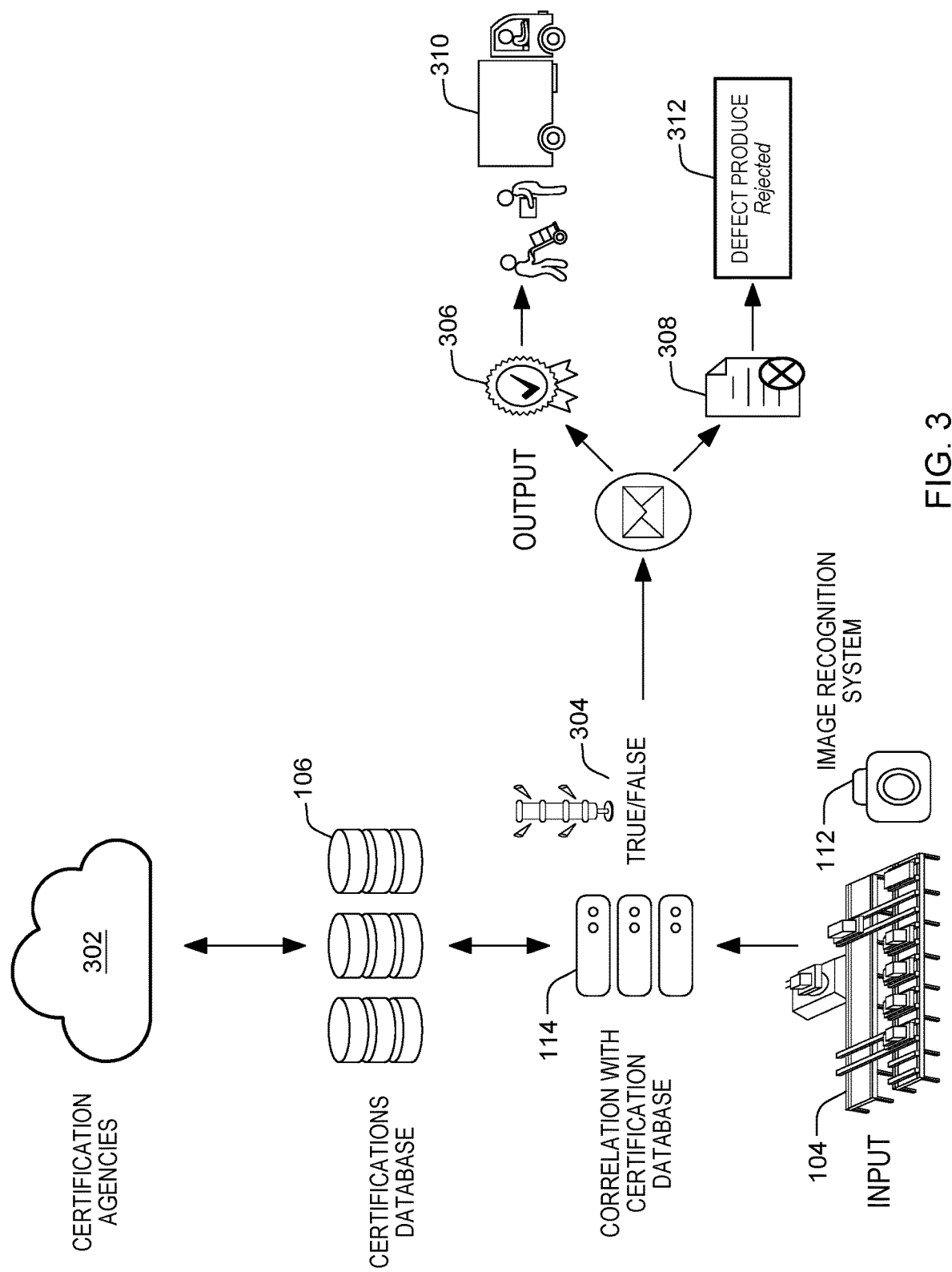
FIG. 3 illustrates an exemplary functional diagram of the validation module within the computing device of FIG. 1, in accordance with an embodiment of the present disclosure.

FIG. 3 illustrates an exemplary functional diagram of validation module 114 in accordance with an embodiment of the present disclosure.

In the example of FIG. 3, validation module 114 may receive product 104 at a validation point as an input. Validation module 114 may inspect product 104 using image recognition system 112. In an example, image recognition system 112 can include multiple angles cameras, high-definition cameras, rotating cameras, and floor cameras. Validation module 114 may correlate information received from image recognition system 112, including image data, against information in certification database 106 to create correlation data. Certification database 106 is associated with certification agencies 302 which issue related certificates for products to be sold and shipped in designated countries. Validation module 114 may create correlation data based on shipping country information on product 104 and certification required for the shipping country for product 104. Validation module 114 may perform a correlation of the image taken through image recognition system 112 against certification database 106. Validation module 114 may correlate the image of certification logo 110 on product 104 against certification database 106 to determine which certifications on product 104. Validation module 114 may validate the correlation data against country of destination information for product 104. Validation module 114 may send indication 304 of invalid to ship status to the predetermined destination if validation module 114 receives a negative validation 308. Validation module 114 may reroute product 104 as rejected product 312 to a predetermined position for at least one of revision and manual inspection if validation module 114 determines that product 104 does not have a required certification logo. If validation module 114 receives positive validation 306, validation module 114 may send indication 304 of valid to ship status for shipping 310 to a predetermined destination. Validation module 114 may alert visually color coding (indication 304) based on lights.

Figure 4:
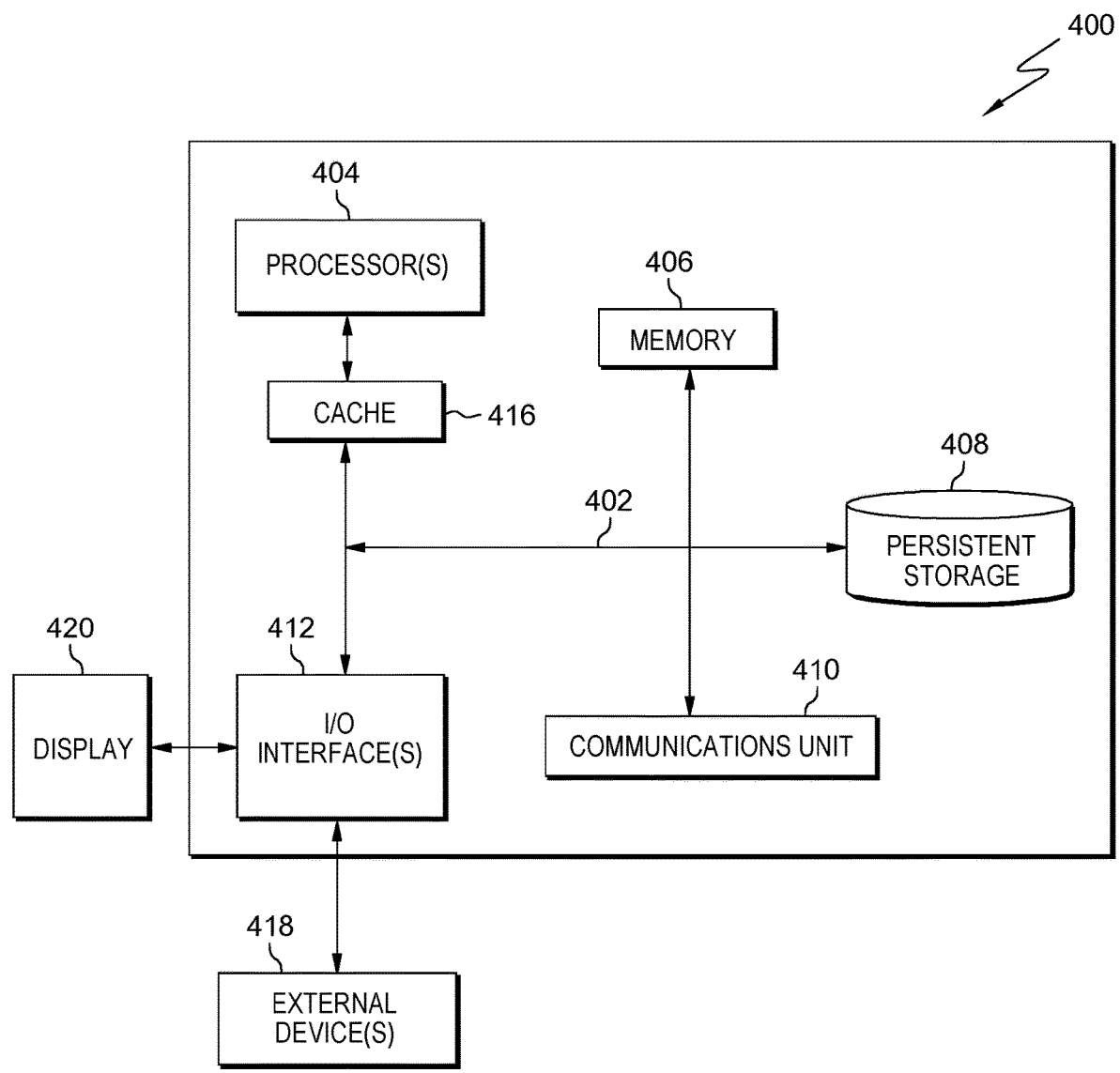
FIG. 4 is a block diagram of components of the computing device of FIG. 1, in accordance with an embodiment of the present disclosure.

FIG. 4 depicts a block diagram 400 of components of computing device 102 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Computing device 102 may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Validation module 114 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Validation module 114 may be downloaded to persistent storage 408 through communications unit 410.

I/O interface(s) 412 allows for input and output of data with other devices that may be connected to computing device 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., validation module 114 can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer system for mitigating errors during a compliance check of a product comprising:
   a computer monitor;
   image recognition components for collecting image data of at least one certification level, wherein the image recognition components include a plurality of hardware cameras including: at least one multiple angle camera, at least one high-definition camera, at least one rotating camera, and at least one floor camera;
   a gyroscopic robotic arm configured to enable rotation of the hardware cameras around a product;
   a hardware-based certification database, wherein the plurality of hardware cameras include a scanner component;
   one or more computer processors;
   one or more computer readable storage media; and
   program instructions stored on the one or more computer readable storage media for execution by at least one of the one or more computer processors, the program instructions comprising:
   program instructions to, in response to receiving the product along an automated production line, cause use of a three-dimensional (3D) laser scanner and QR code scanning component to identify at least one certification label located on the product using the hardware cameras that include the three-dimensional (3D) laser scanner and QR code scanning component and that are mounted on the gyroscopic robotic arm while rotating around the product, wherein the program instructions to identify comprise:
      program instructions to instruct the gyroscopic robotic arm to adjust the plurality of hardware cameras and the 3D laser scanner and QR code scanning component to visually identify and focus on a location of a power supply part of the product in a process of determining where the at least one certification label is located, and
      program instructions to, subsequent to focusing on the location of the power supply part, instruct the plurality of hardware cameras and the 3D laser scanner and QR code scanning component to identify within the location of the power supply part of the product, the at least one certification label;
   program instructions to correlate information received from the plurality of hardware cameras, including the image data of the at least one certification label found on the product, against information in the hardware-based certification database to create correlation data;
   program instructions to correlate information received from the hardware cameras, including image data of the certification label found on the product, against information in the hardware-based certification database to create correlation data;
   program instructions to validate the correlation data against export requirements of a predetermined destination of the product, wherein the validation mitigates an introduction of human errors associated with manual inspections from being introduced into the compliance check of the product;
   program instructions to, in response to receiving a negative validation:
      send an indication of invalid to ship status to the predetermined destination of the product, wherein a certification label is not physically added to the product for negative validations, and
      based on the product not including the certification label, reroute the product as a rejected item to a predetermined bin along the automated production line for revision, wherein the rerouting prevents a stop from occurring on the automated production line; and
   program instructions to, in response to receiving a positive validation:
      causing the certification label to be physically added to the product, and
      based on the product including the certification label, send an indication of valid to ship status to the computer monitor for displaying the indication, wherein the indication includes a visual color coded alert that is pre-associated with positively validated products.

2. The computer system of claim 1, wherein the certification label indicates an agency requirement for shipping the product to the predetermined destination, wherein the certification label includes a QR code that is scanned by the 3D laser scanner and QR code scanning component for identifying the at least one certification label found on the product.

3. The computer system of claim 1, further comprising:
program instructions to identify shipping country information from the product.

4. The computer system of claim 1, further comprising:
program instructions to, in response to a determination that the certification label is unreadable, send an alert requesting a manual inspection of product.

\* \* \* \* \*